May 26, 1970     S. G. INJESKI     3,514,123
COLLAPSIBLE SHOPPING CART
Filed March 27, 1968     2 Sheets-Sheet 1
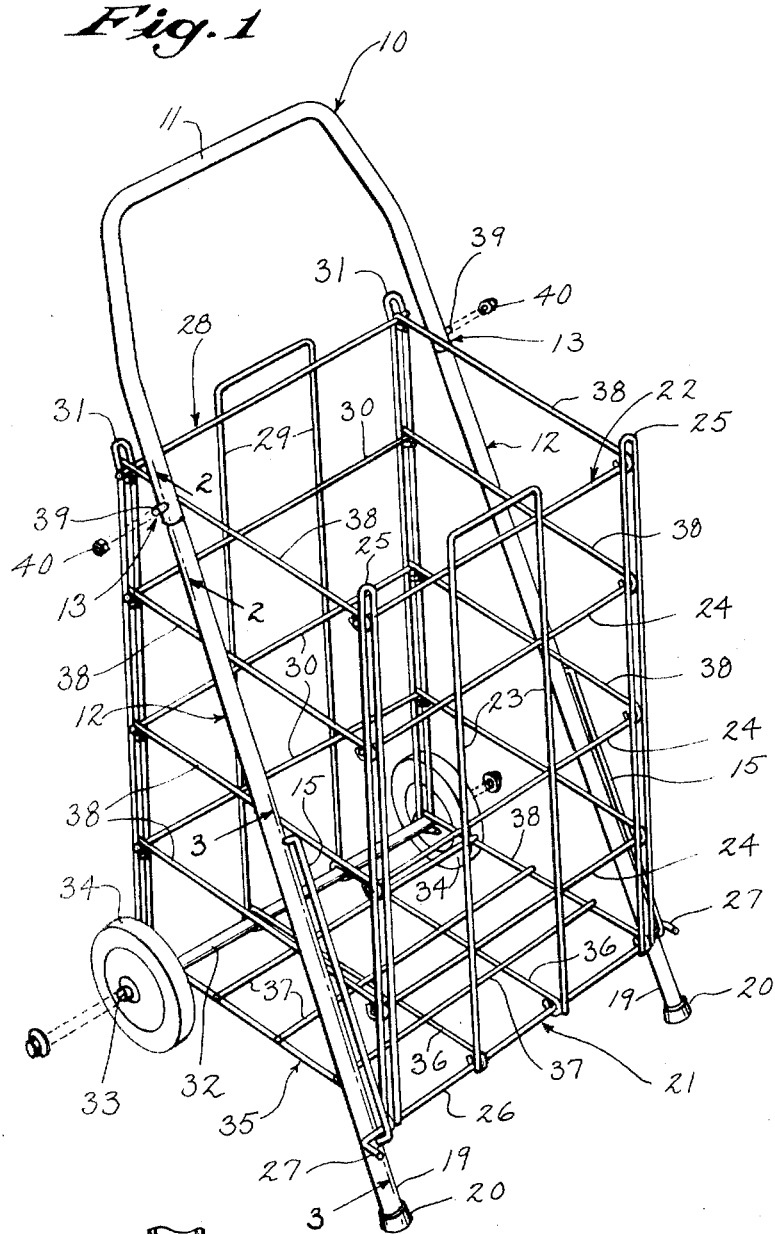
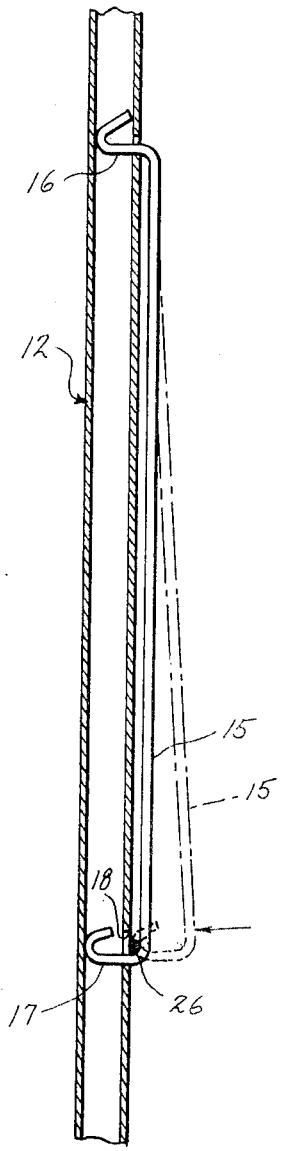
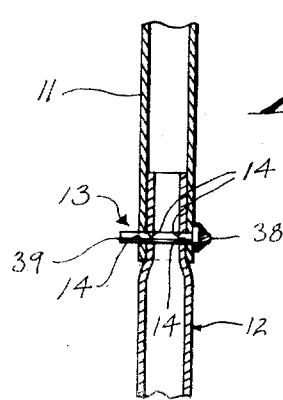
INVENTOR
STANLEY G. INJESKI
BY *Joseph D. Bizzaro Jr.*
ATTORNEY May 26, 1970  S. G. INJESKI  3,514,123
COLLAPSIBLE SHOPPING CART
Filed March 27, 1968  2 Sheets-Sheet 2
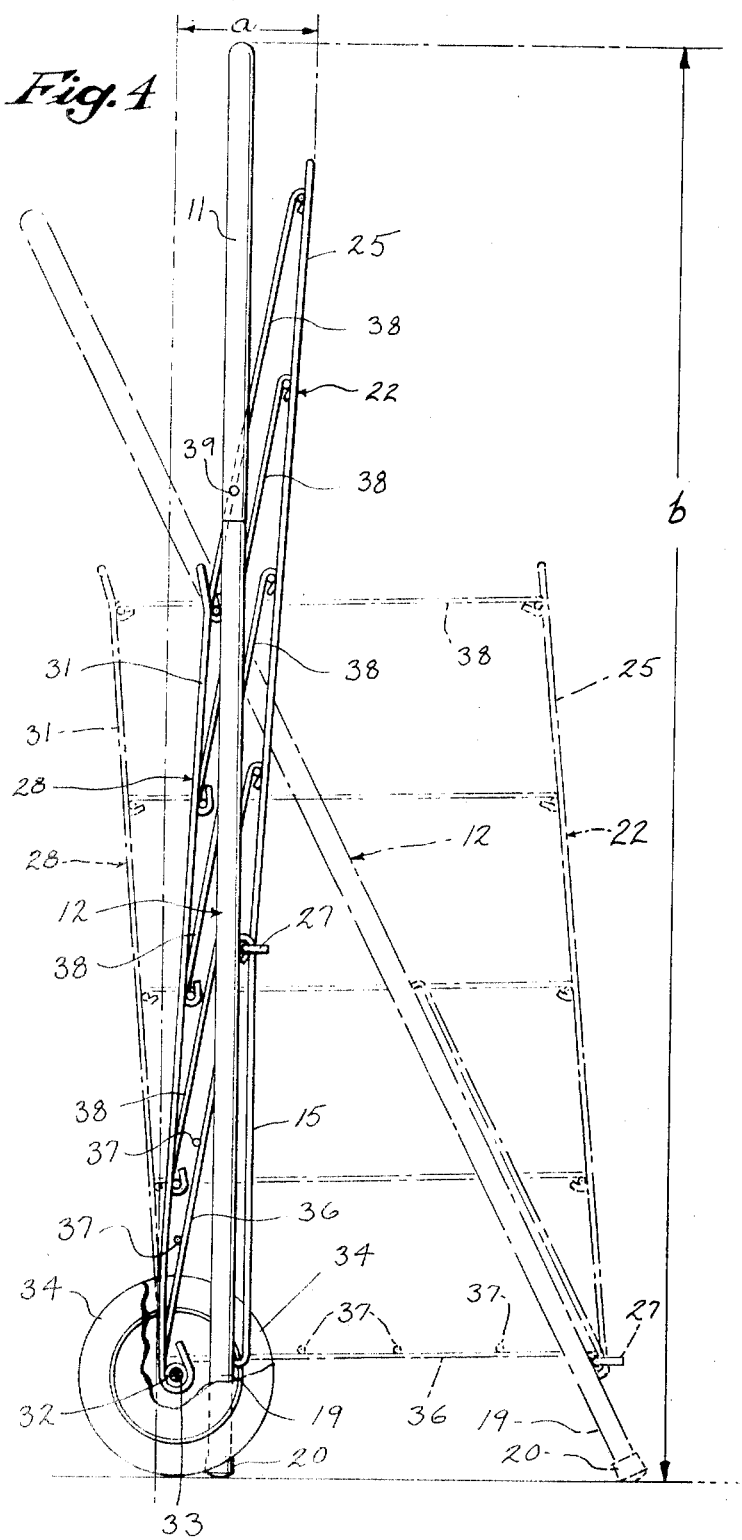
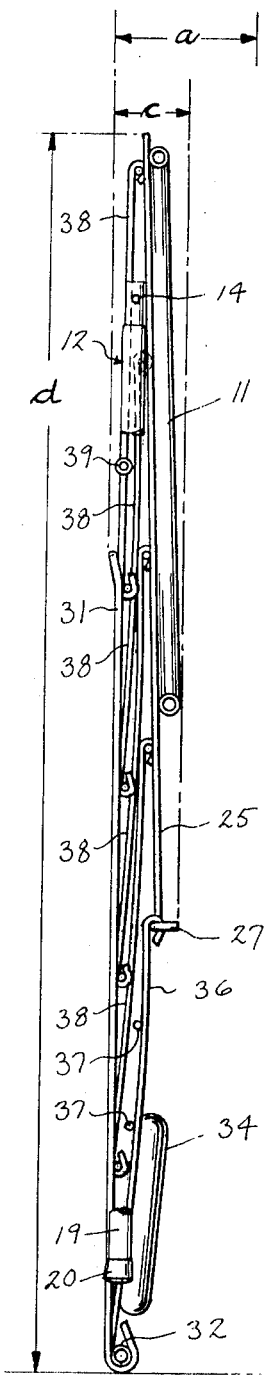
INVENTOR
STANLEY G. INJESKI
BY *Joseph D. Bizzaro, Jr.*
ATTORNEY

United States Patent Office 3,514,123
Patented May 26, 1970

3,514,123
COLLAPSIBLE SHOPPING CART
Stanley G. Injeski, Milwaukee, Wis., assignor, by mesne assignments, to Worldsbest Industries, Inc., Sturgis, Mich., a corporation of Delaware
Filed Mar. 27, 1968, Ser. No. 716,566
Int. Cl. B62b 1/04
U.S. Cl. 280—36     2 Claims

ABSTRACT OF THE DISCLOSURE

A collapsible shopping cart of the type having a U-shaped tubular support frame including a handle piece and two leg pieces depending from the handle piece, a collapsible article-retaining basket adjustable between open and collapsed conditions positioned between said leg pieces and pivotally connected to the support frame, the basket having ground engaging wheels thereon, and means operatively associated with the support frame and basket to limit the movement of the basket between the open and collapsed conditions, wherein the handle piece and leg pieces are advantageously separable, the leg pieces being detachably connected to the handle piece to form the support frame.

BACKGROUND OF THE INVENTION

This invention relates to collapsible shopping carts, and more particularly, to such carts having a structure which results in a substantial reduction of the size of the carton or package in which the collapsible cart is supplied.

It has been the practice in the construction of collapsible shopping carts to assemble all of the components except possibly the wheels at the factory. See, for example, U.S. Pats. No. 2,920,900 and No. 3,207,526. Frequently, shipment of the substantially assembled structure by the manufacturer requires the use of a carton or package in which the collapsible cart is supplied in a collapsed condition which is larger than economically desirable, present-day packaging costs being substantial. The use of larger than desired cartons or packages for shipping the carts is due primarily to the large size of the U-shaped support frame component which usually has a handle and two legs depending therefrom and is of unitary construction.

The problem of providing a reliably constructed collapsible shopping cart whose components can be easily assembled by the user, and which also can be supplied in a carton or package of substantially reduced size thus effecting an economy for the most part has not been fully solved.

SUMMARY OF THE INVENTION

In the present invention there is provided a collapsible shopping cart which is reliably constructed, easily assembled by the user and capable of being supplied in a carton or package of substantially reduced size as compared with collapsible carts heretofore obtainable. This is accomplished by provision of a collapsible cart comprising a support frame having a handle piece and two leg pieces depending from said handle piece, a collapsible article-retaining basket adjustable between open and collapsed positions pivotally connected to the support frame, the basket having ground engaging wheels attachably mounted thereon, and means operatively associated with the frame and the basket to limit the movement of said basket between open and collapsed positions, the support frame being provided with separate handle and leg pieces wherein the leg pieces are detachably connected to the handle piece.

Objects of the present invention are: to provide improvements in collapsible shopping cart constructions; to provide an improved collapsible cart structure for which the components can be separately fabricated, supplied to the user in disassembled form in cartons or packages of substantially reduced size, and then easily assembled by the user; to provide an improved collapsible shopping cart whose generally U-shaped support frame can be fabricated into three separate pieces, i.e., a handle piece and two leg pieces, shipped to the user in separated form, thus facilitating the use of cartons or packages substantially reduced in size, and then detachably connected by the user during the assembly of the cart; and, in general, to provide a collapsible shopping cart having the several cited features and advantages which is quite strong and readily adaptable to various collapsible shopping cart structures while still being relatively simple and inexpensive to manufacture and assemble. Other objects and advantages will become apparent from the following description in which there is shown by way of illustration a preferred embodiment of the invention. Reference is made to the claims at the end of this specification for determination of the scope of the invention.

BRIEF DESCRIPTION OF THE DRAWINGS

FIG. 1 is a view in perspective of a collapsible shopping cart according to the invention, FIG. 2 is a fragmentary view on an enlarged scale of the support frame of the cart partially in section taken on the plane 2—2 of FIG. 1, FIG. 3 is a fragmentary view partially in section and on an enlarged scale of the leg piece of the support frame taken on the plane 3—3 of FIG. 1, the view further showing, by the use of phantom lines, the guide rod of the leg piece in a partially assembled condition, FIG. 4 is a side view of the cart of FIG. 1 on an enlarged scale and shown in collapsed condition, the view further showing, by the use of phantom lines, the cart in open condition, and FIG. 5 is a side view of the cart of FIG. 1 on the same scale as FIG. 4 and shown in collapsed condition with the several components thereof being disassembled for packing in a carton.

DESCRIPTION OF THE PREFERRED EMBODIMENT

Referring to the drawings, there is shown in FIG. 1 a collapsible shopping cart in which the heretofore stated advantages of the invention are provided and which comprises a generally U-shaped tubular support frame 10 fabricated of a material such as chromed steel or aluminum or the like. The support frame 10 includes a generally U-shaped handle piece 11 and two leg pieces 12 which depend from said handle piece and are detachably connected thereto.

A detachable connection 13 between each leg piece 12 and the handle piece 11 is best shown in FIG. 2. As can be seen therein, the leg piece 12 at its connected end is slightly tapered and of a reduced diameter to provide a telescopic fit with the overlying handle piece 11. In order to provide for the detachable connection 13 between the leg piece and the handle piece, aligned openings 14 are provided on corresponding sides of the leg piece 12 and the handle piece 11. The aligned openings 14 receive a pin which extends from the side of a basket as will be described later. The pin serves to detachably secure the leg piece 12 to the handle piece 11 when they are assembled to form the support frame 10.

As can be seen in FIG. 1 and particularly in FIG. 3, the lower portion of each leg piece 12 has operatively associated therewith a guide rod 15 which extends in spaced and parallel relationship thereto. One extremity 16 of said guide rod is in the form of a hook having hooked engagement through a hole provided in the leg piece 12. The other extremity 17 is also in the form of a hook having hooked engagement in a second hole 18 in the leg piece 12, the hole 18 being adapted for a snap-fit type of connection for purposes of retaining said extremity 17. Thus, in assembling the guide rod 15 the upper hooked extremity 16 is first inserted, and then the rod 15 is swung down and the lower hooked extremity 17 is snapped through its opening with a slight momentary bending of the rod 15. The guide rod 15 is then assembled without permanent deformation or welding. Also, as will be explained in further detail later, the guide rod 15 can be employed to entrap an angle hook forming one of the two extremities of a guide member which is disposed on the folding basket portion of the cart.

Referring back to FIG. 1, the leg pieces 12 include downwardly directed free foot portions 19 on which are mounted the foot caps 20. Said caps may be fabricated of rubber, plastic or the like and are intended to be ground engaging members upon which part of the weight of the assembled and open cart is supported.

As can be seen in FIG. 1, there is positioned between the leg pieces 12 a collapsible article-retaining basket 21 which is pivotally connected to the support frame 10. Said basket includes a generally vertical front article-retaining frame 22. The front frame 22 is provided with a wire lattice that includes generally vertical wires 23 welded to horizontal wires 24. The wires are preferably fabricated of chromed steel or aluminum or the like. This lattice is provided for purposes of article retention or, in other words, to form an article-retaining front for the collapsible basket. Canvas, plastic, or the like can be substituted for the lattice, if desired. The horizontal wires 24 of the front frame can be welded at their extremities to U-shaped members 25 that form the vertical margins of the front frame 22. The lower ends of the vertical wires 23 and the U-shaped members 25 are preferably welded to a horizontal guide member 26 of the front frame 22. As can be seen best in FIG. 1, the extremities of the guide member 26 are formed into angle hooks 27 that project outwardly from the front frame 22. It will be appreciated that the angle hooks 27 are linked with and entrapped by the guide rods 15 of the leg pieces 12.

Referring again to FIG. 1, the collapsible basket 21 also includes a generally vertical rear or back article-retaining frame 28 which is parallel to the front frame 22. Similarly as said front frame, the rear or back frame 28 is provided with a lattice that includes generally vertical wires 29 which are preferably welded to horizontal wires 30. The horizontal wires 30 can be welded at their extremities to U-shaped members 31 that form the vertical margins of the rear or back frame 28. The lower ends of the vertical wires 29 and the U-shaped members 31 in the rear frame 28 are preferably welded to a horizontal quill member 32. It will be appreciated that said quill houses an axle 33 on each end of which ground engaging wheels 34 are rotatably supported. The wheels can be retained on the axle by mounting a friction fitting retaining member on the ends thereof, and they provide mobility and support for the collapsible cart.

As seen best in FIG. 1, the collapsible basket 21 also includes a bottom article retaining frame 35. Said bottom frame is provided with a wire lattice which includes longitudinally extending wires 36 and transversely extending wires 37 welded thereto. The longitudinally extending wires 36 are preferably looped around the horizontal quill member 32 at the rear and the guide member 26 at the front of the cart. The bottom frame 35 is thus hingedly connected to the lower end of both the front and the rear frames 22 and 28, respectively.

Still referring to FIG. 1, lateral wire members 38 are hingedly associated with the front frame 22 and the rear frame 28 to constitute therewith a box-like article-retaining structure having a rectangular cross section. Said wire members 38 are preferably fabricated of a substantially rigid, resilient material such as chromed steel or aluminum or the like, and are pivotally engaged with the front and rear frames 22 and 28 to permit the relative displacement of said frames towards and away from each other thus permitting the basket 21 to be collapsed or opened.

In addition to the pivotal connection provided between the front and back frames and the lateral wire members 38, there is also provided a pivotal connection between the collapsible basket 21 and the support frame 10. To accomplish this, a pair of pivot pins 39 are provided on the uppermost lateral wire members 38, with one pin protruding outward from each side of the basket, as can be seen in FIGS. 1 and 2. The resilient wire members 38 permit the insertion of the pins 39 into the aligned openings 14 of the handle piece 11 and the leg pieces 12 of the support frame 10. Also, the resilient wire members 38 on which the pins 39 are mounted result in a bias fit for the pins thus preventing the leg pieces 12 from being detached from the handle piece 11 once the cart is assembled. A friction fitting cap member 40 can be placed over the ends of each pivot pin 39 for decorative purposes.

It will be appreciated that the guide rods 15 on the leg pieces 12 and the collaborating angle hooks 27 of the guide member 26 predetermine the general movement of the front frame 22. Such movement is limited as established by the positions of extremities 16 and 17 of the guide rods 15. This limited movement will accommodate movement of the basket 21 between its open and collapsed positions as seen best in FIG. 4.

FIG. 4 illustrates, in solid lines, the collapsed condition of the assembled cart in accordance with which front frame 22 is displaced to a position proximate and parallel to rear frame 28, the lateral wire members 38 being displaced from the position of FIG. 1 and assuming positions wherein they are aligned at relatively small acute angles relative to frames 22 and 28.

FIG. 4 also illustrates, in phantom lines, a side view of the collapsible cart in its open position wherein the front frame 22 is parallel to but substantially spaced from the rear frame 28, the lateral wire members 38 being aligned at substantially right angles to said frames 22 and 28.

In keeping with the general provisions of the invention, a manufacturer of the several components of the collapsible cart can preferably supply them to the user in a detached or unassembled condition, thus permitting the use of a shipping carton or package of substantially smaller size than heretofore obtainable, a suitable compact arrangement of the components being shown in FIG. 5. For the sake of clarity, the axle 33 is not shown but is included and intended to be included in the compact shipping arrangement. For example, the unassembled components of the cart can advantageously be shipped in a carton having outside dimensions no larger than 33¾ inches in length by 16¾ inches in width by 1¾ inches in depth. In FIG. 5, the depth of a suitable shipping arrangement of unassembled components is indicated by the letter $c$ which the length is indicated by the letter $d$. In contrast, the conventional way of shipping a collapsible cart in a substantially assembled and collapsed condition would require a carton or package of larger size that increases costs. This is best seen in FIG. 4 where the depth of an assembled but collapsed cart is indicated by the letter $a$ while the length is indicated by the letter $b$ (the wheels of course are removed for shipment). It can be seen that $a$ and $b$ are larger than $c$ and $d$. It will be appreciated that the detached components of the cart according to the invention can be easily assembled by the user.

It is contemplated that collapsible cart arrangements other than the particular one shown in the drawings can be used in the construction of a collapsible cart according to this invention. Although a specific structural form of this invention has been illustrated and described, the invention is not limited to the specific construction herein disclosed and it is expected that those skilled in the art may be able to devise changes in or alternatives to the disclosed structural features while still practicing this invention. It is to be understood, therefore, that it is intended to cover all changes and modifications of the illustrated embodiment of this invention herein disclosed, as well as other embodiments not disclosed, which do not constitute a departure from the true spirit and scope of this invention.

What is claimed is:

1. In a collapsible shopping cart having
    a collapsible article-retaining basket presenting a bottom, a front, a back and two sides adjustable between an open position and a collapsed position and having ground engaging wheels,
    a support frame extending along both sides of the basket and bridging across the top thereof to provide a handle, and
    a connection between the frame and a bottom portion of the basket, the improvement therein which comprises: a support frame having a generally U-shaped handle piece and a pair of leg pieces detachable therefrom, said leg pieces each disposed along one side of the basket with an upper part thereof pivotally connected thereto, said handle piece bridging across the upper parts of said leg pieces in a position above said basket and telescopically engaged with the upper part of each leg piece with a common pivotal connection therewith to the basket;
    each leg piece of the support frame being tubular and provided with a pair of spaced holes; and
    guide rods in corresponding positions on the leg pieces of said support frame and extending parallel to and spaced from the leg pieces, said rods including extremities having the form of hooks and engaged in said holes, one of the holes on each leg piece retaining the associated extremity therein by means of a snip-fit.

2. The cart of claim 1 wherein the leg pieces and handle piece of said support frame are provided with aligned openings; the sides of said baskets including lateral wire members which are substantially rigid and resilient; and pivot pins in corresponding positions on corresponding lateral wire members which are insertable through the aligned openings in the leg pieces and handle pieces of the support frame and resiliently retained in pivotal relationship therewith to connect said basket to said support frame.

References Cited

UNITED STATES PATENTS

| | | | |
|---|---|---|---|
| 2,920,900 | 11/1960 | Best | 280—36 |
| 3,400,942 | 9/1968 | Hull | 280—39 |

LEO FRIAGLIA, Primary Examiner

R. R. SONG, Assistant Examiner